BULK MATERIAL HANDLING SYSTEMS

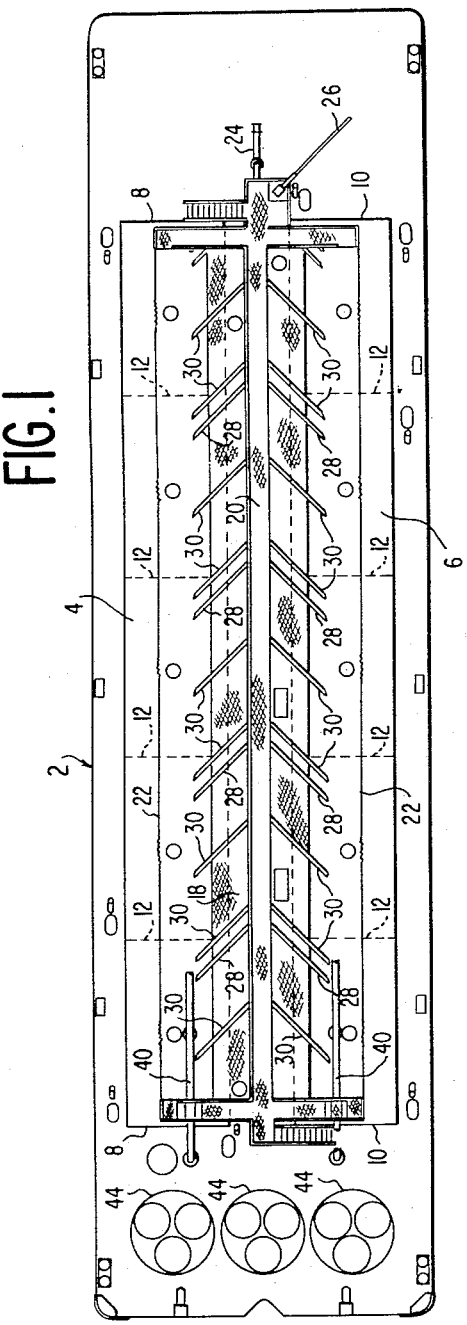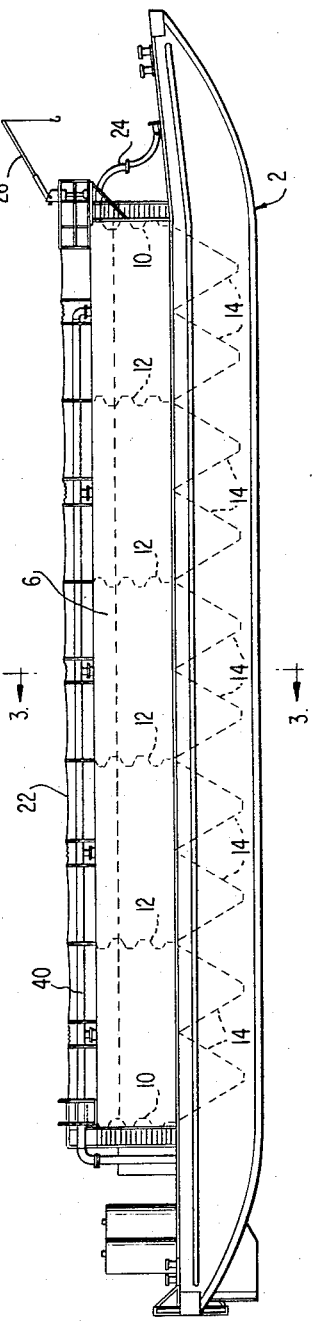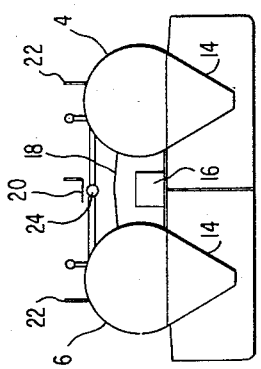

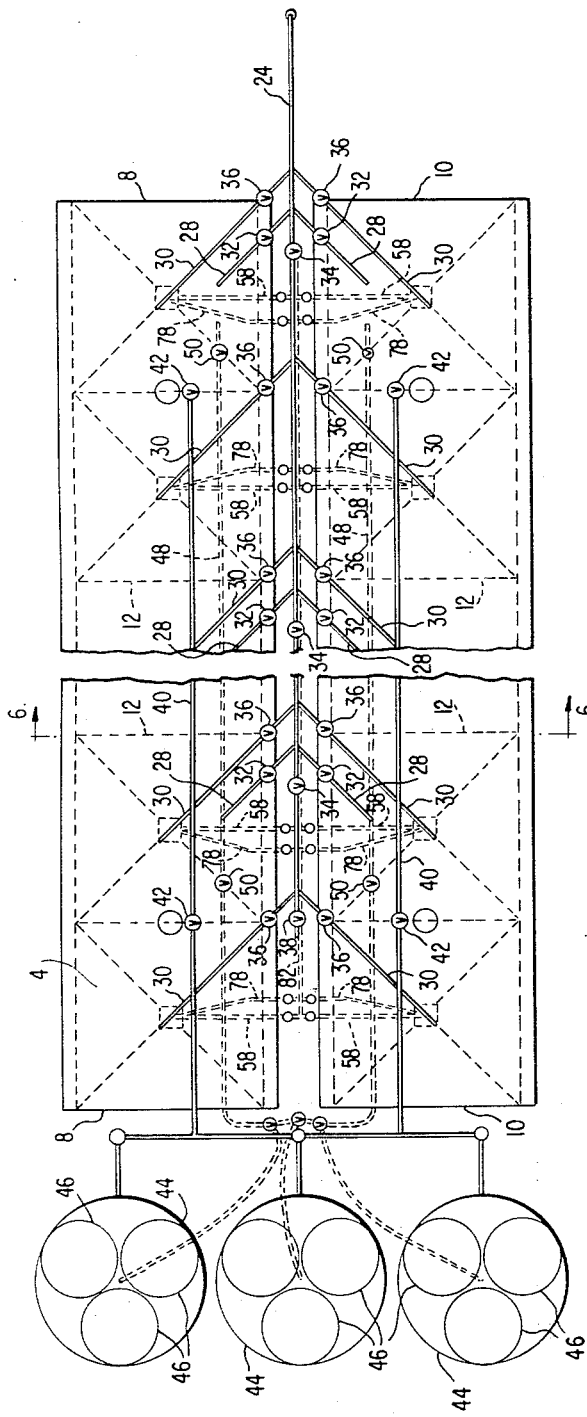
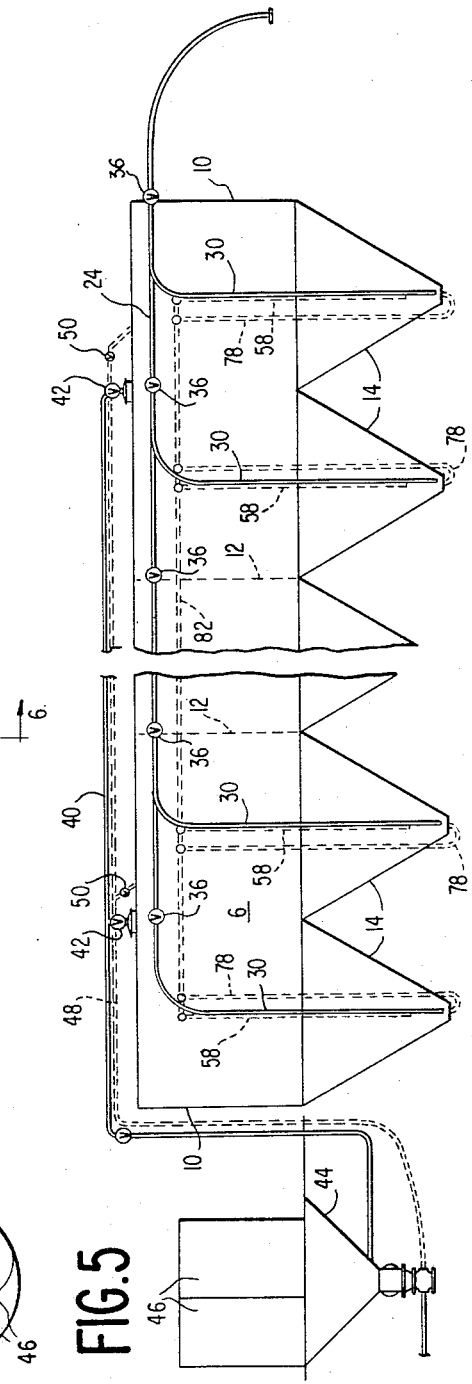
FIG. 4
FIG. 5
INVENTORS
OCIE D. ATTEBERRY
HOWARD O. PAGE
ATTORNEYS INVENTORS
OCIE D. ATTEBERRY
HOWARD O. PAGE
By Burns, Doane, Benedict,
Swecker & Mathis
ATTORNEYS Nov. 14, 1967     H. O. PAGE ET AL     3,352,606

Filed Aug. 19, 1964     4 Sheets-Sheet 4

INVENTORS
OCIE D. ATTEBERRY
HOWARD O. PAGE

Burns, Doane, Benedict, Swecker & Mathis

ATTORNEYS

United States Patent Office 3,352,606
Patented Nov. 14, 1967

3,352,606
BULK MATERIAL HANDLING SYSTEMS
Howard O. Page and Ocie D. Atteberry, Duncan, Okla., assignors to Halliburton Company, Duncan, Okla., a corporation of Delaware
Filed Aug. 19, 1964, Ser. No. 390,552
6 Claims. (Cl. 302—52)

This invention relates to systems for transporting bulk materials and, more particularly, to pneumatic systems for loading and unloading dry pulverulent materials from large capacity transport vehicles.

In transporting large quantities of dry pulverulent materials on a barge, for example, the time required for loading and unloading the barge becomes an important factor affecting the efficiency of transporting the material. If the barge is loaded or unloaded slowly, more barges would be required to transport a certain quantity of material between two locations during the same time interval than would be required if the barge could be loaded and unloaded quickly. It is also important in transporting large quantities of material to many scattered storage areas that the system for loading and unloading the barge be self contained on the barge, otherwise it would be necessary to provide separate loading and unloading apparatus at each shore storage area. A self contained transfer system on the barge permits greater flexibility and reduces the investment in transfer machinery at the shore installations.

Another consideration in constructing an efficient barge for transporting pulverulent materials is that the storage bins and transfer equipment be so arranged that the size of the barge is minimized in relation to the volume of the material transported. This permits the barge to be made as small as posible to improve its maneuverability.

When unloading a storage bin in a transport vehicle, it is particularly important that the system be capable of removing substantially all of the pulverulent material in the storage bins. If the bins in the vehicle are filled with a different material, and there are still remaining in the bins large quantities of the material previously stored in the bins, there may be sufficient contamination to render the material unusable. When the transfer system is not capable of unloading substantially all of the material in the storage bins on the vehicle, the capacity of the vehicle is reduced and the material remaining in the storage bins is dead weight.

Accordingly, it is an object of this invention to provide an efficient transporting system capable of storing and transporting large quantities of dry pulverulent materials.

It is a further object of this invention to provide a transporting system for rapidly loading and unloading large quantities of pulverulent material.

It is another object of this invention to provide an efficient system for conveying and transporting dry bulk material so that only a minimum quantity remains in the storage tanks.

These objects are accomplished in accordance with a preferred embodiment of the invention by a barge having a pair of rows of storage tanks extending along opposite sides of a barge deck with engines and other machinery mounted on the barge between the rows of tanks. The tanks each have individual inlet and outlet conduits connected to a common manifold pipe which serves as a fill and discharge pipe. The pulverulent materials are conveyed into and out of the tanks by air currents which fluidize the particles. A manifold in each tank directs air currents toward the outlet conduit to sweep the particles into the conduit, so that substantially all of the material is discharged from the storage tank. Valves are provided in the conduits for controlling the flow of air and materials to and from the tanks and thereby individually filling and emptying each tank.

This preferred embodiment is illustrated in the accompanying drawings in which:

FIG. 1 is a top plan view of a barge having the bulk material handling system of this invention mounted thereon;

FIG. 2 is a side elevational view of the barge;

FIG. 3 is a cross sectional view of the barge along the line 3—3 in FIG. 2;

FIG. 4 is a top plan view, partially schematic, of the distribution and storage system of this invention;

FIG. 5 is a side elevational view, partially schematic, of the distribution and storage system;

Figure 6:
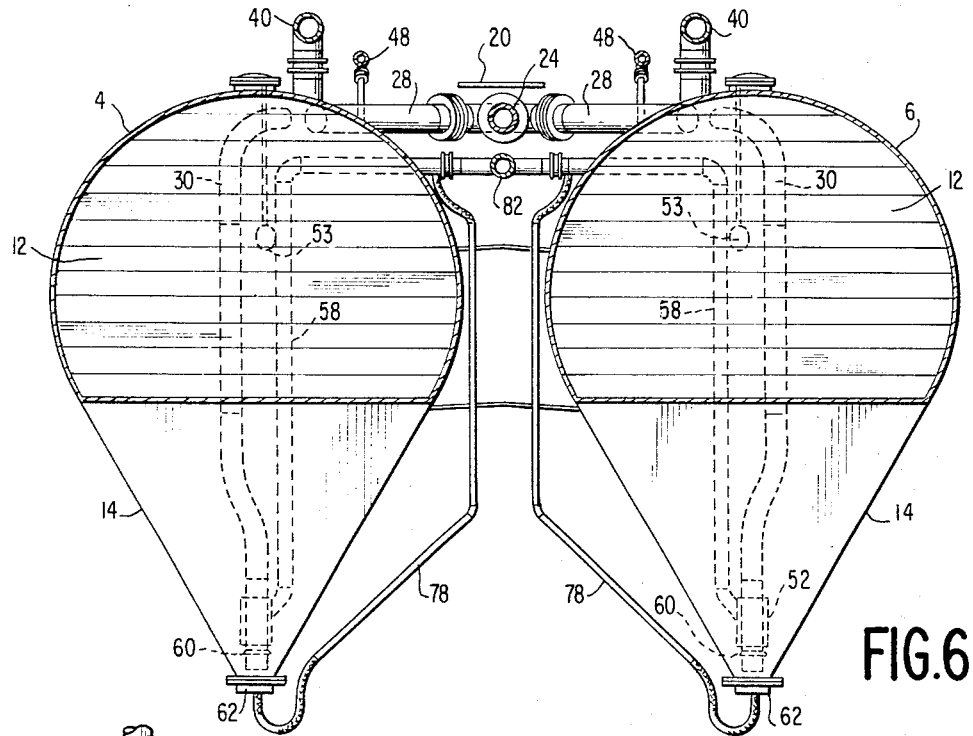
FIG. 6 is an enlarged sectional view along the line 6—6 in FIG. 4.

The bulk material handling system of this invention is mounted on a barge, as shown in FIGS. 1 and 2. The barge 2 is of a conventional design and is arranged to be towed by a tug boat in the conventional manner. The barge 2 has a pair of elongated circular shells 4 and 6 extending longitudinally of the barge. Each of the shells is closed at its opposite ends by end walls 8 and 10, respectively.

The shells 4 and 6 are divided into a plurality of compartments or tanks by partitions 12 at uniformly spaced intervals along the length of the shells. The partitions 12 are corrugated, as shown in FIG. 2, for greater strength. Referring to FIGS. 2 and 3, the lower portion of each compartment has a pair of hollow receptacles 14 secured along their adjacent edges to each other and along the remaining edges to the hollow shell, and the end walls or partitions 12. Thus, the shells 4 and 6, the receptacles 14 and the walls 8, 10 and 12 form a plurality of individual, pressure tight compartments. The receptacles 14 extend below the deck of the barge 2 to lower the center of gravity of the loaded barge. As shown in FIGS. 1 and 3, the space between the shells 4 and 6 houses auxiliary engines, air compressors and associated equipment, shown generally at 16, and this machinery area is covered by a roof 18. A walkway 20 is mounted over the roof 18 between the tanks, and wire rope life lines 22 extend along the top of the shells 4 and 6. Mounting the heavy engines and air compressors along the center of the barge in the machinery area tends to stabilize the barge.

The compartments or tanks are filled and discharged through a common header pipe 24, which extends along the shells 4 and 6 under the walkway 20. The header pipe 24 has a hose coupling on one end which is supported on the deck of the barge, shown in FIG. 2, and a hoist 26 is in position for lifting a hose from the shore to facilitate connecting the hose with the coupling on the header pipe 24. A plurality of fill pipes 28 extend outwardly from the header pipe 24 adjacent each compartment. Each fill pipe 28 has one end connected to the header pipe 24 and extends through the respective shells 4 or 6 into one of the compartments. Since there are two receptacles 14 in each compartment, there are a pair of discharge pipes 30 in each compartment. Each discharge pipe 30 extends upwardly from the bottom of one of the receptacles 14 and through the shell 4 or 6 and is connected with the header pipe 24.

As shown in FIG. 4, each fill pipe 28 and discharge pipe 30 intersects the header pipe 24 at an angle of approximately 45°. This arrangement requires less power for pumping the material into and out of the compartments than would be required if the pipes intersected at 90° as is the conventional practice. The power requirements are less, since the angular change of direction of the fluid stream is less and there is less fluid resistance as the fluidized stream of pulverulent material passes through the joint. Valves are provided in each of the fill and discharge pipes for controlling fluid flow through the pipes. Each of the fill pipes 28 has a valve 32 adjacent the pipe 24 for controlling the flow of material through the pipe 28. There are also valves 34 in the header pipe 24 for shutting off progressively the flow of fluid through sections of the header pipe 24. The discharge pipes 30 also have valves 36 for individually controlling the flow of material out of each of the receptacles 14. The end of the header pipe 24 opposite the shore pipe coupling has a jet valve 38 thereon, which may be adjusted for controlling the pressure in the header pipe 24.

Figure 7:
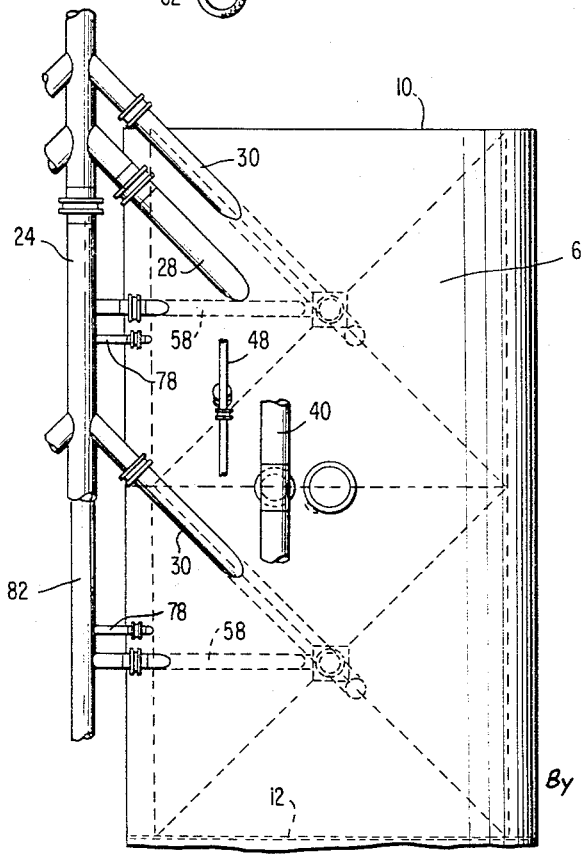
FIG. 7 is an enlarged top plan view of a portion of the storage tanks.

When the compartments are being filled, the particles of material are fluidized in an air stream and flow through the header pipe 24 toward one of the compartments. The valve 32 in one of the fill pipes 28 is open and the fluid stream flows through the pipe 28 and into one of the compartments. Since the compartments are air tight, the flow of air into the compartment increases the air pressure in the compartment. Therefore, it is necessary to continually withdraw air from the compartment to assure adequate circulation of the fluid through the header pipe 24 and the fill pipe 28. To provide for air circulation, a vent pipe 40 (FIGS. 4 and 5) communicates with each of the compartments and a valve 42 controls the flow of air from each compartment into the vent pipe 40. As shown in FIGS. 6 and 7, the vent pipe 40 communicates with each compartment near the top of the shell 6 and midway of the length of the compartment. The vent outlet, however, is out of the direct path of the air stream issuing from the fill pipe 28. Therefore, the air stream will follow a circular path around the shell and the heavier particles will be deposited in the tank, while only the lighter particles will be carried upward by the stream and flow into the vent pipe 40.

It will be apparent that while a compartment is being filled, the air flowing into the vent pipe 40 will contain dust particles. If this dust is allowed to escape from the system, there may be a significant loss of material. Therefore, the air stream from the vent pipe 40 is filtered to remove the dust particles and the material is returned to the compartment being filled. A dust collector having three dust collector units 44 is mounted at the rear of the barge 2. Although three units 44 are shown, the system of this invention may be operated with only one dust collector unit. The dust collector units are of a conventional cyclone type in which dust laden air flows from the bottom of a separator to the top and the heavy particles in the air fall to the bottom of the separator. The finer particles in the air are trapped on filter screens 46 of the dust collector. The screens are vibrated periodically to cause the particles to be shaken off of the screens and fall to the bottom of the separator. The precipitated particles which are extracted from the air stream in the vent lines 40 by the dust collector units 44 are returned from the separator through a feed back pipe 48 from each unit 44. Conventional valves are included in the vent pipe 40 and the feed back pipes 48 adjacent the dust collector so that the collector units 44 may be operated in sequence. For example, one unit 44 may be in operation, while another is being vibrated to dislodge the particles from the screens 46. The material carried by the air stream in the feed back pipe 48 flows back into the same compartment which is being filled. Valves 50 control the flow. By means of this arrangement, there is a continuous circulation of air from the header pipe 24, through the fill pipe 28 and the compartment, through the vent pipe 40 and the separator 44, and back to the same compartment through the feed back pipe 48. In this manner, the compartments may be filled rapidly, without waste of material.

Figure 10:
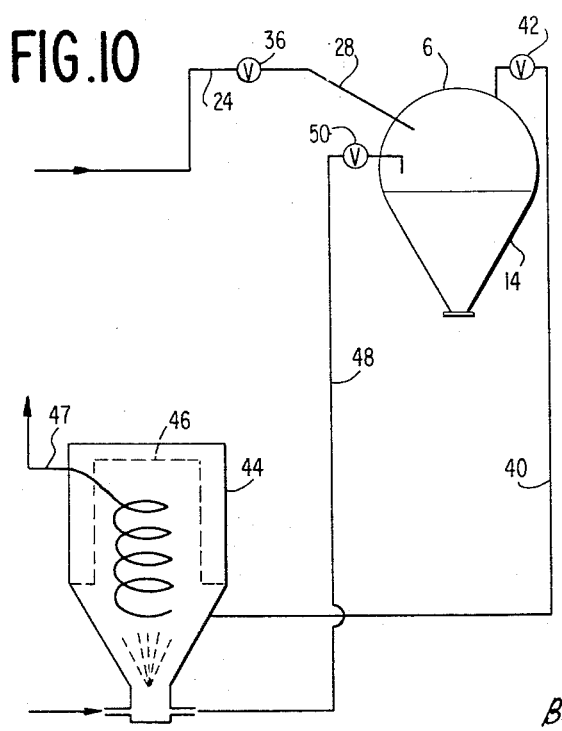
FIG. 10 is a schematic view of the distribution system while the tanks are being filled with pulverulent material.

The compartment filling system is shown diagrammatically in FIG. 10. The pulverulent material which is suspended in an air stream, flows through the header pipe 24. All of the valves 36 in the discharge pipes 30 are closed and the only valves in the fill pipes 28, vent pipe 40 and feed back pipe 48 which are open are those communicating with the compartment being filled. The air stream flows from the header pipe 24 through the fill pipe 28 and into the compartment. The air stream issuing from the fill pipe 28 circulates through the shell 6 and flows out of the compartment through the vent pipe 40. From the vent pipe 40, the air stream, which carries with it dust particles of the pulverulent mtaerial, is directed into a separator unit 44. The air current from the vent pipe 40 swirls upwardly through the dust collector and through a filter element 46 and is exhausted through an outlet 47. The particles are precipitated to the bottom of a dust collector 44 and air is supplied from a compressor (not shown) to blow the particles into the feed back line 48 where they are returned to the compartment 6.

Figure 8:
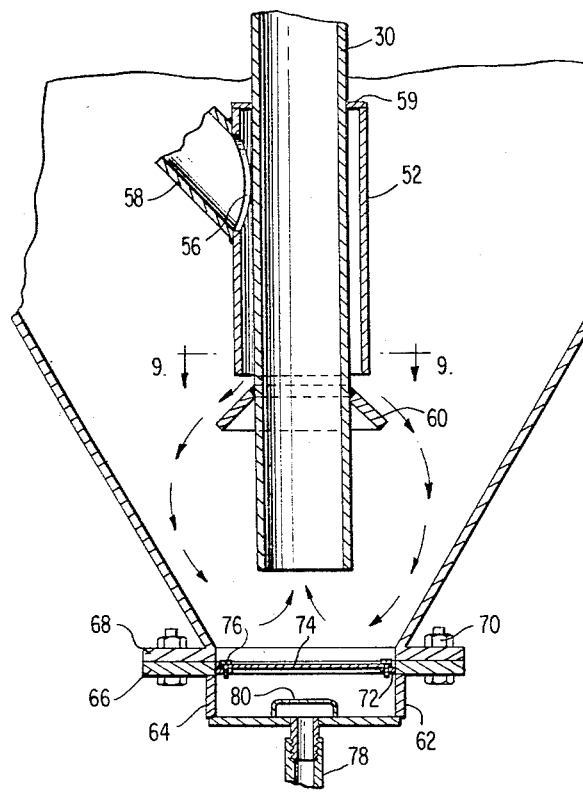
FIG. 8 is a detail cross sectional view of a typical lower portion of the tanks.
Figure 9:
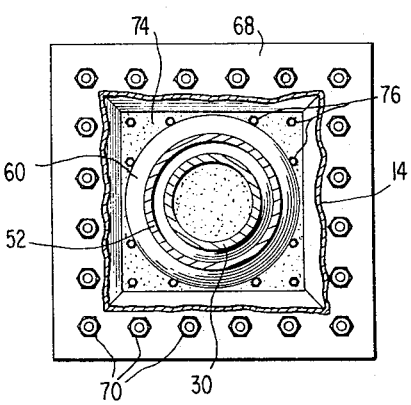
FIG. 9 is a cross sectional view of a tank along the line 9—9 in FIG. 8.

The material is discharged from the compartments through the header pipe 24. The end of the header pipe 24 has a coupling which may be attached to a hose from a shore tank. Referring particularly to FIGS. 6, 7, 8 and 9, the compartments are usually filled to a level approximately midway of the height of the shells 4 and 6 and a level indicator 53 is provided in each compartment for determining the level of the material in the compartment. The discharge pipe 30 extends downwardly into the compartment and the bottom of the pipe 30 is spaced above the lower end of the receptacle 14. As shown in FIG. 8, a manifold 52 is secured on the discharge pipe 30 adjacent its lower end. The upper end of the manifold 52 has an annular plate 59, which is welded or otherwise secured to the pipe 30 and maintains the manifold 52 in substantial alignment with the central axis of the pipe 30. The manifold 52 also has a radial opening 56 adjacent its upper end and an inlet pipe 58 is secured to the manifold 52. The pipe 58 is arranged for directing a stream of air toward the open end of the manifold 52. Directly below the manifold 52, a collar 60 is secured on the discharge pipe 30. The collar 60 slopes downwardly and outwardly for directing the flow of air from the manifold 52 toward the sides of the receptacle 14.

The receptacles 14 are in the shape of hollow, inverted pyramids, which are square in horizontal cross section. The bottom of each receptacle 14 has an aerator assembly 62. The aerator assembly 62 is in the form of a hollow box 64 having outwardly extending flanges 66 which are clamped to corresponding flanges 68 on the lower end of the receptacle 14 by bolts 70 spaced at intervals around the flanges. The box 64 has a shoulder extending around the inside of the box and a porous plate 74 is fastened to the shoulder 72 by screws 76. An air supply pipe 78 communicates with the interior of the box 64 and a diffuser 80 is mounted in the box over the outlet of the pipe 78 for directing the air outwardly through the opposite open ends of the diffuser 80. The plate 74 is sufficiently porous for the air to flow out of the box 64 through the plate and fluidize the particles above the plate 74. The plate may be formed of sintered bronze which has sufficiently small pore openings to prevent the material in the tank from sifting through the plate.

Referring to FIGS. 6 and 7, air under pressure is supplied from an air compressor to a header 82 which extends between the shells 4 and 6 and beneath the header pipe 24. The pipe 78 for supplying air under pressure to the aerator assembly 62 is connected to the header 82, as shown in FIG. 7, and the header 82 also supplies air to the interior of the manifold 52 through the inlet pipe 58. As is shown schematically in FIG. 8, the currents of air issuing from the open end of the manifold 52 are directed outwardly by the deflector collar 60 toward the sides of the receptacle 14 in a circular pattern to sweep the particles into the discharge pipe 30. Air under pressure also flows upwardly through the porous plate 74 to fluidize the particles adjacent the lower end of the discharge pipe 30.

The jet valve 38 in the header pipe 24 receives air under pressure from a compressor (not shown) and bypasses a portion of the air into the header pipe 24. All of the valves 32 in the fill pipes 28 are closed and all of the valves 36 in the discharge pipes 30 are closed, except the valve 36 in the discharge pipe 30 communicating with the particular receptacle 14 which is to be emptied. The valve 36 in that pipe 30 is open. The flow of air through the header pipe 24 reduces the pressure in the discharge pipe 30 and at the same time, the air flowing into the receptacle 14 through the air supply pipe 78 and the inlet pipe 58 increase the pressure in the compartment. This difference in pressure causes the particles in the bottom of the receptacle 14 to flow into the discharge pipe 30. The flow pattern of the air flowing outwardly from the manifold 52 in combination with the air stream flowing upwardly from the porous plate 74 assures that substantially all of the pulverulent material in the receptacle 14 is discharged through the pipe 30 and substantially none of the material remains in the receptacle. Only one of the valves 36 is opened at a time. After the receptacle 14 is emptied, the valve 36 is closed and the valve 36 in the discharge pipe 30 of the next receptacle 14 is opened. In this way the receptacles 14 may be emptied sequentially until the entire barge is unloaded. After all of the receptacles 14 are emptied, the jet valve 38 (FIG. 4) may be opened while all of the valves 36 are closed to clean out the header pipe 24 by blowing air through the pipe 24 and thereby avoiding contamination of other materials which may be loaded on the barge.

Figure 11:
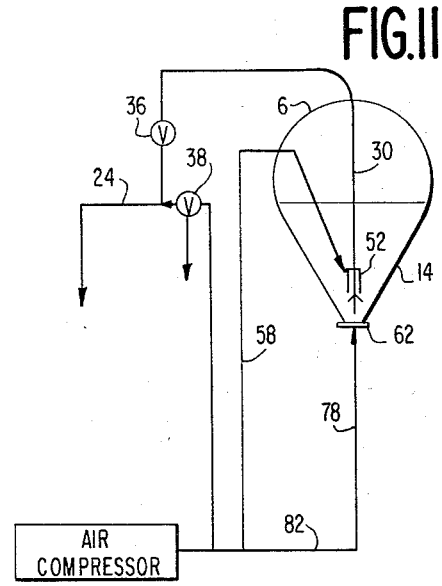
FIG. 11 is a schematic view of the distribution system while the tanks are being emptied.

The compartment discharge system is illustrated schematically in FIG. 11. Air from the air compressor is supplied to the header 82 and flows through the jet valve 38 and into the header pipe 24. Air under pressure is also supplied through the pipe 58 to the interior of the manifold 52. The air supply pipe 78 which is also connected with the header 82 supplies air to the aerator assembly 62. Air is drawn into the pipe 30 by the air flowing in the header pipe 24 when the valve 36 is open and the air flowing out of the manifold 52 and upwardly from the plate 74 of the aerator assembly 62 fluidizes the particles in the bottom of the receptacle 14. The fluidized stream of particles flows into the discharge pipe 30 and from the pipe 30, the fluidized particles flow into the common header pipe 24, where they are conducted to a shore storage tank.

The particular advantages of this invention are that it may be operated for transferring pulverulent materials at a rapid rate. Since the entire discharge system is contained on the barge, it is not necessary to provide equipment at each unloading site for discharging the material from the barge. Furthermore, due to the particular arrangement of the fill and discharge system, large sizes of pipe of the order of 12 inches in diameter, may be used without becoming clogged. The discharge system of this invention is particularly efficient in emptying substantially all of the material within the receptacles 14, so that there is a minimum of waste and contamination. The compartment filling system also minimizes waste by recirculating the dust particles which are carried off through the vent, and substantially all of the pulverulent material is deposited in the storage compartments.

While this invention has been illustrated and described in one embodiment, it is recognized that variations and changes may be made therein without departing from the invention as set forth in the claims.

We claim:

1. Apparatus for filling and emptying a tank of dry pulverulent material comprising: a tank having inwardly sloping sides terminating in a base, a discharge pipe extending upright in the tank and having one end spaced above said base, said base including a porous plate, means for pumping air through the plate toward the end of the discharge pipe, a manifold surrounding said discharge pipe adjacent said one end, means for supplying air to the interior of said manifold, means on the discharge pipe for deflecting air from the manifold toward said sides, a fill pipe having one end in said tank, a header pipe, said fill pipe and said discharge pipe each having their respective opposite ends communicating with said header pipe, and means for pumping air through said header pipe, whereby the tank is filled and emptied through the common header pipe.

2. Apparatus for filling and emptying a tank of dry pulverulent material comprising: a tank having inwardly sloping sides terminating in a base, a discharge pipe extending upright in the tank and having one end spaced above said base, said base including a porous plate, means for pumping air through the plate toward the end of the discharge pipe, a manifold surrounding said discharge pipe adjacent said one end, means for supplying air to the interior of said manifold, means on the discharge pipe for deflecting air from the manifold toward said sides, a fill pipe having one end in said tank, said tank having a vent, means for withdrawing air from said vent, filter means for removing dust particles from the withdrawn air, means for returing the dust particles to said tank, a header pipe, said fill pipe and said discharge pipe each having their respective opposite ends communicating with said header pipe, and means for pumping air through said header pipe, whereby the tank is filled and emptied through the common header pipe.

3. Apparatus for filling and emptying a tank of dry pulverulent material comprising: a tank having inwardly sloping sides terminating in a base, a discharge pipe extending upright in the tank and having one end spaced above said base, said base including a porous plate, means for pumping air through the plate toward the end of the discharge pipe, a manifold surrounding said discharge pipe adjacent said one end, a collar secured on the discharge pipe between said manifold and said one end, means for supplying air to the interior of said manifold, a fill pipe having one end in said tank, a header pipe, said fill pipe and said discharge pipe each having their respective opposite ends communicating with said header pipe, valve means in said fill pipe and said discharge pipe for controlling flow therethrough, and means for pumping air through said header pipe, whereby the tank is filled and emptied through said header pipe.

4. Apparatus for filling and emptying a tank of dry pulverulent material comprising: a tank, said tank having a semi-cylindrical shell forming the upper portion thereof and a pair of receptacles suspended from said shell, each of said receptacles having inwardly sloping plane sides terminating in a base, said shell extending longitudinally of the tank and the bases of said receptacles being spaced apart longitudinally of said shell, a pair of discharge pipes extending upright in the tank, the end of each discharge pipe being spaced above one of said bases, a manifold surrounding each of said discharge pipes adjacent said one end, means for supplying air independently to the interior of each manifold, a fill pipe having one end in said tank, a header pipe, said fill pipe and said discharge pipes each having their respective opposite ends communicating with said header pipe, valve means in said fill pipe and said discharge pipes for controlling flow therethrough, and means for pumping air through the header pipe, whereby the tank is filled and emptied through the header pipe and each receptacle in the tank is emptied separately.

5. Apparatus for filling and emptying a tank according to claim 4 wherein said fill and discharge pipes intersect said header pipe at an acute angle.

6. Apparatus for discharging pulverulent material from a tank, a discharge pipe extending upright in the tank, said tank having inwardly sloping sides terminating in a base, said base being permeable to air and extending substantially between said sides, the end of said discharge pipe being spaced above said base, a cylindrical manifold secured concentrically on said pipe and defining an annular chamber between said manifold and said pipe, said manifold having a closed upper end and having an open lower end, a frusto-conical collar secured on said discharge pipe adjacent said manifold and between said manifold and the end of the pipe, said collar extending outwardly from said pipe a distance greater than said manifold and sloping downwardly, said discharge pipe being substantially cylindrical between said manifold lower end and said pipe end, and means for supplying air to the interior of said manifold and upwardly through the base whereby the air streams sweep the fluidized material into the discharge pipe.

References Cited

UNITED STATES PATENTS

| | | | |
|---|---|---|---|
| 2,409,211 | 10/1946 | Kalle | 55—431 X |
| 2,221,741 | 11/1940 | Vogel-Jorgensen | 302—53 |
| 2,712,476 | 7/1955 | Happel | 302—53 |
| 2,744,793 | 5/1956 | McKinney | 302—53 |
| 2,975,000 | 3/1961 | Davis | 302—53 X |
| 3,189,061 | 6/1965 | Stackel et al. | 141—68 |
| 3,195,241 | 7/1965 | Hohne | 55—431 X |

FOREIGN PATENTS

| | | |
|---|---|---|
| 987,622 | 4/1951 | France. |

LAVERNE D. GEIGER, *Primary Examiner.*

E. J. EARLS, *Assistant Examiner.*